United States Patent [19]

Kawabe et al.

[11] 4,175,708
[45] Nov. 27, 1979

[54] METHOD OF TRANSPORTING LIQUID PITCH CONTAINING LUMPY COKES AND APPARATUS THEREFOR

[75] Inventors: Naoshi Kawabe; Hisatsugu Kaji; Naotaka Miwa, all of Ichihara; Hajime Nakanishi, Fujisawa; Fumiaki Tanaka, Sagamihara; Tatsuya Inoue, Yokohama, all of Japan

[73] Assignee: Kureha Kagaku Kogyo Kabushiki Kaisha, Tokyo, Japan

[21] Appl. No.: 870,804

[22] Filed: Jan. 19, 1978

[30] Foreign Application Priority Data

Jan. 27, 1977 [JP] Japan .................................. 52-7304

[51] Int. Cl.² ............................................. B02L 23/00
[52] U.S. Cl. ........................................ 241/16; 241/29; 241/42; 241/43

[58] Field of Search ...................... 241/15, 16, 21, 29, 241/38, 41, 42, 43, 46 R, 46 B, 69, 46.08, 46.11, 46.17, 79

[56] References Cited

U.S. PATENT DOCUMENTS

| | | | |
|---|---|---|---|
| 1,741,869 | 12/1929 | Mett | 241/46 R X |
| 2,280,944 | 4/1942 | Foresman | 241/46 R |
| 3,774,853 | 11/1973 | Seifert | 241/46.17 |
| 3,788,568 | 1/1974 | Marsh | 241/46.17 X |

Primary Examiner—Richard B. Lazarus
Attorney, Agent, or Firm—Stevens, Davis, Miller & Mosher

[57] ABSTRACT

Disclosed is a method of transporting liquid pitch containing lumpy coke wherein the lumpy coke contained in the liquid pitch is pulverized by a specific procedure and the pitch containing the thus pulverized coke is then transported. Disclosure is also made for a specific apparatus used for the method.

8 Claims, 2 Drawing Figures

METHOD OF TRANSPORTING LIQUID PITCH CONTAINING LUMPY COKES AND APPARATUS THEREFOR

FIELD OF THE INVENTION

This invention concerns a method and an apparatus for transporting liquid pitch containing lumpy coke which is produced upon thermal cracking of heavy petroleum oil or coal tar.

BACKGROUND OF THE INVENTION

Liquid pitch produced upon thermal cracking of heavy petroleum oil or coal tar in a reactor has heretofore been transported by pumping after the recovery from the reactor. In such a pumping transportation of the liquid pitch, however, coke which has deposited on the inside wall of the reactor often detaches therefrom and intrudes in a lumpy state into the pitch. This sometimes causes clogging in the suction port of a pump and/or piping to hinder the transportation of the liquid pitch, resulting in a serious effect on the continuous operation of the thermal cracking system. As stated above, continuous and stable transportation for the liquid pitch is difficult at present.

SUMMARY OF THE INVENTION

It is, therefore, an object of this invention to provide a method and an apparatus for continuous and stable transportation of liquid pitch containing lumpy coke produced upon thermal cracking of heavy petroleum oil or coal tar.

This and other objects of this invention will be apparent by the descriptions hereinbelow.

We have made various studies for attaining the foregoing objects and, as the result, discovered that no clogging results in the suction inlet of a pump and/or piping upon transporting the above liquid pitch by pumping, by taking out the liquid pitch from a reactor, pulverizing the lumpy coke contained therein and then transporting the liquid pitch containing the thus pulverized coke.

According to the present invention, there is provided a method for transporting liquid pitch containing lumpy coke produced upon thermal cracking of heavy petroleum oil or coal tar, which method includes the steps of; (1) introducing the liquid pitch removed from a reactor into a vessel provided internally with means for pulverizing solids, a side discharge outlet having means for filtration by meshes, and an opening under the bottom of the solids pulverization means, (2) filtering the liquid pitch thus introduced into the vessel and taking out the filtrate from the vessel through the side discharging outlet, while pulverizing the lumpy solids left in the vessel and removing it as a slurry through the opening provided under the bottom of the solid pulverization means and, (3) mixing the filtrate and the slurry containing the solids with each other and transporting the resultant mixture. This invention further provides an apparatus having pumps and piping for the transportation of liquid pitch containing lumpy coke, which apparatus includes a vessel having a solids pulverizing means provided internally, a side discharge outlet, which has means for filtration by meshes and an opening disposed under the bottom of the solids pulverization means, the side discharge outlet and the bottom opening being connected together outside of the vessel and the connection point being disposed ahead of the pump at its suction side.

DETAILED DESCRIPTION OF THE INVENTION

Figure 1:
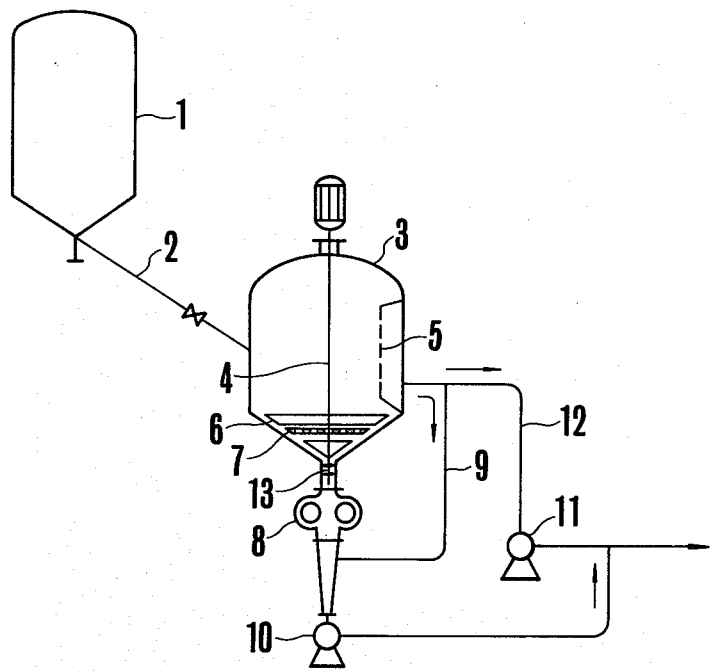
FIG. 1 is an explanatory view of one embodiment of a system for transporting liquid pitch containing lumpy coke according to this invention.
Figure 2:
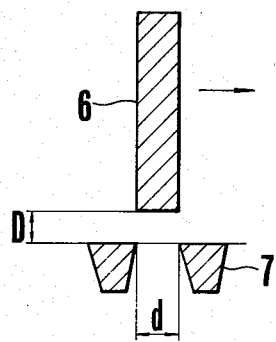
FIG. 2 is an explanatory view showing a part of one embodiment of a solids pulverization means provided in the vessel of the apparatus according to this invention.

This invention is to be described in both its method and apparatus aspects referring to FIG. 1 and FIG. 2 of the accompanying drawings.

FIG. 1 shows a system of transportation for liquid pitch according to this invention. In FIG. 1, liquid pitch containing lumpy coke is taken out from a reactor 1 and then once charged by line 2 into a pitch reception vessel 3. A large part of lumpy coke separates out by sedimentation from the pitch in the vessel 3 and the liquid pitch containing coke particles smaller than a predetermined size is passed through a strainer 5 and a pitch coveying line 12 and then conveyed to the outside of the system by a pitch pump 11. The lumpy coke is at first coarsely crushed between blades 6 of a stirrer 4 and a grid-like perforated plate 7 and then further pulverized by a pulverizer 8, which is connected to a coke discharge pipe disposed below the vessel 3, into a transportable size and then delivered in the form of a coke-containing slurry by way of a pump 10.

For the adjustment of the slurry concentration, the pitch is additionally introduced into the suction side of the pump 10 through a branch line 9 from the pitch conveying line.

The method of this invention using the apparatus also according to this invention will be described in the sequence of procedures. The liquid pitch formed in the reactor 1 is temporarily stored in the vessel 3 to roughly separate the coke and pitch from each other. The vessel 3 may be integrated with the reactor 1. In order to avoid the inclusion of crushed lumpy coke to the pitch to be discharged, in this case, line 12 is connected to a vertical side wall of the vessel 3 and a strainer 5 of, for example, a 5-10 mm mesh size is provided at the discharge outlet inside of the vessel 3. The mesh size of the strainer 5 may be determined depending on the type of the pump 11. It is necessary to provide the blades 6 in the vessel 3 in order to prevent bridge formation by the lumpy coke. Since the blade 6 is not used for mixing, 1-10 R.P.M. of slow rotation is sufficient and a great torque can be obtained even with a small driving source. One of the characteristic features of this invention is to effect coarse crushing of the lumpy coke in the clearance between a grid-like perforated plate 7 and blades 6 utilizing the torque of the latter.

Conventionally, it may also be considered possible to pulverize the lumpy coke without blades 6 by directly pulverizing the lumpy cokes with a pulverizer disposed below the vessel, but such an arrangement would not prevent bridge-formation above the pulverizer. In this invention, bridge-formation can be overcome by gently crushing the lumpy coke coarsely in a relatively wide space in the vessel 3 with the grid-like perforated plate 7 and the blade 6 and further pulverizing the coarsely ground lumpy coke into a slurry form with a pulverizer disposed just below the vessel 3. In order to prevent bridge-formation between the vessel 3 and the pulverizer 8, it is preferred to extend the shaft of the stirrer 4 into the discharging pipe just below the vessel 3 and provide a plate-like or frame-like agitator 13 in the discharging pipe.

The openings in the grid-like perforated plate 7 are determined depending on the diameter of the inlet of the coke pulverizer 8 and, preferably, are 10–40 mm. The gap D between the blade 6 and the grid-like perforated plate 7 is, as shown in FIG. 2, smaller than the opening d in the grid-like perforated plate 7, that is, the blade 6 is disposed over the surface of the grid-like perforated plate 7 with a clearance slightly smaller than the opening d in the plate. It is preferable as well to form the cross section of the grid-like perforated plate 7 into that of an upturned trapezoid so that crushed cokes can easily pass through between the grids without clogging.

The performance of the pulverizer is determined depending on the allowable particle size in the feed to the pump.

Control of the concentration and the amount of the slurry is determined by the transportation performance of the pulverizer and the pump 10. For controlling the slurry concentration, a part of the pitch is removed at a vertical wall of the vessel 3 via the discharge pipe and is introduced through the branch line 9 to the suction side of the pump. This enables a system combining the pulverizer 8 and the pump 10 on a single line which has previously been considered impossible. This invention will be further illustrated by reference to the following examples.

EXAMPLE 1

In a thermal cracking plant for thermally cracking vacuum residues, apparatus having the following specifications was assembled into a system as shown in FIG. 1 and liquid pitch (a pitch-softening temperature of 200°–250° C.) containing lumpy coke (of a size ranging between 10–200 mm) at 350° C. was transported at a rate of 15 ton/hour.

Pitch reception vessel: 5.5 m (dia.), 4 m (height)
Stirrer: Driving power: 7.5 kW, 6 rpm
Grid: opening: 30 mm, Clearance between stirrer Blade: 20 mm
Strainer at pitch outlet: Opening: 10 mm The process was conducted with a pitch feed rate at 10 ton/hr., slurry output at 5 ton/hr., a coke concentration (of coke size less than 10 mm in average) between 5–45% and with the amount of the liquid pitch introduced through the branch line at 3–5 ton/hr. The result of a continuous 4000 hours of slurry transportation demonstrated the excellent effect of this invention in that the operation was highly stable with neither damage to the apparatus nor any clogging in the piping system.

In slurry transportation without stirrer, grid-like perforated plate or pulverizer, clogging was observed in the piping in 200–500 hours and the operation had to be interrupted.

EXAMPLE 2

A liquid pitch (a pitch-softening temperature of 100°–150° C.) containing lumpy coke (of a size ranging between 10–200 mm) at 200° C. was transported by the same procedure as described in Example 1. The results were the same as obtained in Example 1.

EXAMPLE 3

A liquid pitch (a pitch-softening temperature of 50°–80° C.) containing lumpy coke (of a size ranging between 10–200 mm) at 100° C. was transported by the same procedure as described in Example 1. The results were the same as those obtained in Example 1.

We claim:

1. A method of transporting liquid pitch containing lumpy coke produced upon thermal cracking of heavy petroleum oil or coal tar in a reactor, which comprises the steps:
   (a) introducing the liquid pitch removed from the reactor into a reception vessel provided with internal means for pulverizing solids, with a side discharge outlet having means for filtration, and with a bottom opening beneath said pulverizing means;
   (b) filtering a first portion of the liquid pitch in the reception vessel and removing the filtrate from the vessel through the side discharge outlet;
   (c) pulverizing the lumpy coke in the vessel and removing the pulverized coke with a second portion of liquid pitch, as a slurry, through the bottom opening; and
   (d) mixing the filtrate and the slurry containing the pulverized coke and feeding the resultant mixture to the suction side of a pump.

2. The method of transporting the liquid pitch as defined in claim 1, wherein said coke lumps are at least 10 mm in diameter.

3. An apparatus for treatment of a mixture liquid pitch and solid coke to render the mixture suitable for transport by pumping, said apparatus comprising:
   a vessel;
   means for introducing the mixture of liquid pitch and solid coke into the vessels;
   a first discharge opening at the bottom of said vessel;
   a second discharge opening at the side of said vessel;
   means for pulverizing the solid coke within said vessel;
   means for filtering the liquid pitch removed through said second discharge opening; and
   means for blending the pitch portions removed through said first and second discharge openings.

4. The apparatus of claim 3 further comprising means for further pulverizing solid coke in the pitch removed from the vessel through said first discharge opening.

5. The apparatus of claim 3 wherein the pulverizing means located within the vessel comprises:
   a perforated plate; and
   a bladed stirrer located above and adjacent to said perforated plate for pulverizing the solid coke therebetween.

6. The apparatus of claim 3 further comprising a pump for transport of the blended pitch portions.

7. The apparatus of claim 4 wherein the pulverizing means located within the vessel comprises:
   a perforated plate; and
   a bladed stirrer located above and adjacent to said perforated plate for pulverizing the solid coke therebetween.

8. The apparatus of claim 4 further comprising a pump for transport of the blended pitch portions.

* * * * *